United States Patent
Manchester

(10) Patent No.: US 7,339,284 B2
(45) Date of Patent: Mar. 4, 2008

(54) APPARATUS FOR GENERATING ELECTRICAL POWER FROM TIDAL WATER MOVEMENT

(76) Inventor: Jonathan Ralph Manchester, 2 Cowell Grove, Rookswood, Rowlands, Gill NE39 2JQ (GB)

(*) Notice: Subject to any disclaimer, the term of this patent is extended or adjusted under 35 U.S.C. 154(b) by 0 days.

(21) Appl. No.: 10/527,590
(22) PCT Filed: Sep. 10, 2003
(86) PCT No.: PCT/GB03/03904

§ 371 (c)(1),
(2), (4) Date: Feb. 21, 2006

(87) PCT Pub. No.: WO2004/027257

PCT Pub. Date: Apr. 1, 2004

(65) Prior Publication Data
US 2006/0232072 A1    Oct. 19, 2006

(30) Foreign Application Priority Data
Sep. 20, 2002  (GB) .................. 0221896.4

(51) Int. Cl.
*F03B 13/26* (2006.01)
(52) U.S. Cl. ....................................... 290/42
(58) Field of Classification Search .......... 290/54
See application file for complete search history.

(56) References Cited

U.S. PATENT DOCUMENTS 2,501,696 A * 3/1950 Souczek ................ 290/43

(Continued)

FOREIGN PATENT DOCUMENTS

DE    3341984 A1 *   5/1985

(Continued)

OTHER PUBLICATIONS

Telefax transmittal from J. Schwartz of Sep. 26, 2007.*
"Tidal Turbine Technology" Peter Fraenkel, Creating an All-Energy Future, Aberdeen, Feb. 27 to 28, 2001.

*Primary Examiner*—Joseph Waks
(74) *Attorney, Agent, or Firm*—Jack Schwartz & Associates, PLLC

(57) ABSTRACT

A tidally driven electricity generator (1) has a series of turbines (2), each of which is mounted under water in an offshore location. Each turbine (2) has blades (3) which are rotated by tidal flow of water, to power a respective generator (4), which outputs AC electrical power via a respective transformer (5) to a cable (6) and appropriate switchgear (7). The cable (6) is connected to a further transformer (8) located onshore, and the transformer (8) is connected to two AC inputs of a drive (9) containing an AC/DC converter, one input (10) of which is connected via a cable to a control feedback device (11). The control feedback device (11) may be a flow meter which determines the velocity of the tidal flow, or may contain look-up tables containing information relating to the velocity of tidal flow at any particular time. The drive (9) outputs DC electrical signals along cabling (13) to DC/AC converter (14), which outputs AC electrical powervia transformer (15) to a fixed frequency local supply grid (16). The drive (9) also controls the speed of rotation of each turbine (2) by adjustment of the frequency of signals output to the turbines from the drive (9) via switchgear (7).

10 Claims, 1 Drawing Sheet

U.S. PATENT DOCUMENTS

Figure 1:
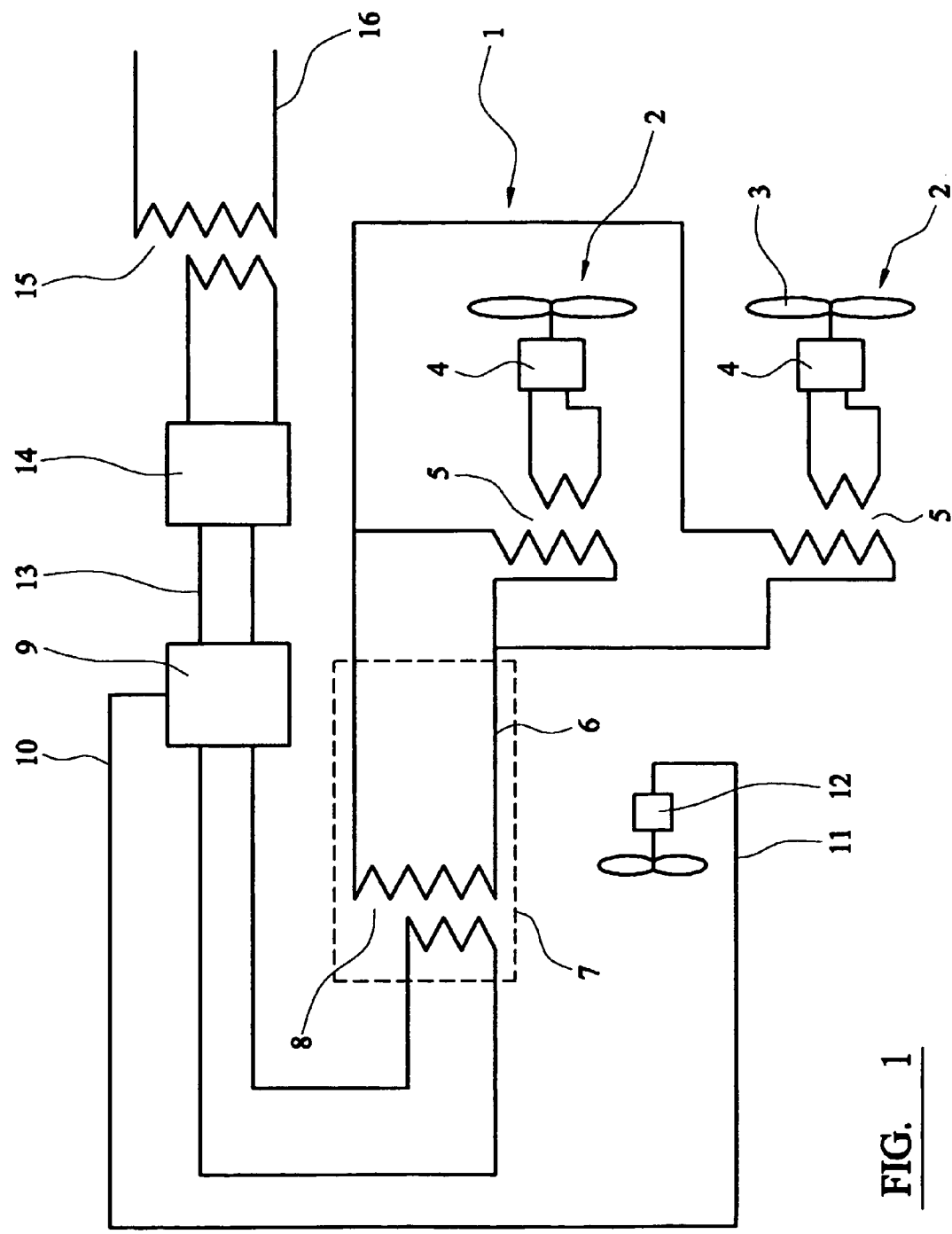

| | | | | |
|---|---|---|---|---|
| 4,306,157 A | * | 12/1981 | Wracsaricht | 290/54 |
| 4,754,156 A | | 6/1988 | Shiozaki et al. | |
| 4,823,018 A | * | 4/1989 | Kuwabara et al. | 290/7 |
| 4,868,408 A | * | 9/1989 | Hesh | 290/52 |
| 5,440,176 A | * | 8/1995 | Haining | 290/54 |
| 5,798,572 A | * | 8/1998 | Lehoczky | 290/54 |
| 5,798,631 A | * | 8/1998 | Spee et al. | 322/25 |
| 6,104,097 A | * | 8/2000 | Lehoczky | 290/54 |
| 7,042,114 B2 | * | 5/2006 | Tharp | 290/54 |
| 2003/0218338 A1 | * | 11/2003 | O'Sullivan et al. | 290/43 |
| 2004/0070210 A1 | * | 4/2004 | Johansen et al. | 290/43 |

FOREIGN PATENT DOCUMENTS

| | | |
|---|---|---|
| FR | 2 324 895 A | 4/1977 |
| FR | 2616178 A1 * | 12/1988 |
| GB | 2 348 250 A | 9/2000 |
| WO | WO 01 34973 A | 5/2001 |
| WO | WO 02 057623 A | 7/2002 |

\* cited by examiner

APPARATUS FOR GENERATING ELECTRICAL POWER FROM TIDAL WATER MOVEMENT

The present invention relates to an apparatus for generating electrical power from tidal water movement, and relates particularly, but not exclusively, to an apparatus for supplying electrical power of a fixed frequency to a grid of a frequency different from that of electrical power output by individual generators.

It is known to generate electrical power by means of so-called wind farms, in which a series of turbines is each driven by wind power to produce electrical output power. The efficiency of operation of any particular turbine of such a wind farm is determined by the angle of incidence of fluid driving the turbine with the turbine blades, and has a maximum value for any given speed of rotation of the turbines.

It is known to control the efficiency of turbines of wind farms by controlling the angle of incidence by adjusting the pitch of the turbine blades, or by adjusting the speed of rotation of the turbine blades relative to the stator of each turbine.

There is presently considerable interest in producing electrical power from tidal water movement, especially in countries having relatively long coastlines, such as the United Kingdom. Tidally driven turbines are generally submerged offshore, and are controlled by means of control apparatus located in offshore towers extending above each turbine, for example as shown in documents accompanying the presentation "Tidal Turbine Technology", Peter Fraenkel, Creating an All-Energy Future, Aberdeen, 27 to 28 Feb. 2001.

However, known tidally driven turbines of this type suffer from the drawback that maintenance and repair of electrical control apparatus located in an offshore tower is both difficult and expensive, and the electrical insulation required to prevent ingress of seawater into the control apparatus also increases the cost of the apparatus. Furthermore, there are considerable difficulties associated with applying the known techniques used in wind farms to tidally driven turbines. In particular, turbines having blades of variable pitch are complex and expensive to manufacture, and arrangements used in wind farms in which electrical control equipment is mounted to each generator are very expensive to apply to tidally driven turbines, in which the control apparatus must be located offshore and protected from the marine environment.

Preferred embodiments of the present invention seek to overcome the above disadvantages of the prior art.

According to an aspect of the present invention, there is provided an apparatus for generating electrical power from tidal water movement, the apparatus comprising:

at least one electrical turbine adapted to be driven by tidal water movement to generate a respective first electrical signal; and drive means located remotely from the or each said turbine for receiving the or each said first electrical signal, controlling the speed of rotation of the or each said turbine to adjust the efficiency thereof, and outputting at least one second electrical signal to supply electrical power generated by the or each said turbine.

By providing control means located remotely from the or each turbine, this provides the advantage that in the case of tidally-driven turbines being located offshore, the electrical control components can be located onshore. This significantly reduces the cost and difficulty in maintaining and repairing the apparatus, and also significantly reduces the degree of electrical insulation needed to protect the control components. Furthermore, the present invention is based on the surprising discovery that although the speed of tidal water flow varies significantly over time, at a given time the speed does not vary significantly over the area occupied by an installation of several turbines. This enables several turbines to be controlled by a single controlling device located onshore and connected to the turbines by a single cable. This in turn makes the present invention significantly more cost effective than the prior art.

The apparatus of the present invention also has the advantage that it is of significantly simpler construction and maintenance than a conventional apparatus having turbine blades of variable pitch, which significantly reduces the cost of apparatus of the invention compared with such prior art apparatus. Furthermore, by having drive means located remotely from the turbines, it is possible to provide additional drives to add redundancy to the apparatus, and by selectively connecting the additional drives to one or more of the turbines, as opposed to providing additional drives for each turbine, this enables the redundancy to be added more cost effectively.

The apparatus may further comprise feedback means for providing at least one first control signal for use in controlling the speed of rotation of the or each said turbine by said drive means to adjust the efficiency thereof.

In a preferred embodiment, the apparatus further comprises control means for receiving the or each said second electrical signal and outputting at least one third electrical signal to supply electrical power generated by the or each said turbine, wherein said control means is adapted to control the frequency of the or each said third electrical signal.

This provides the advantage of enabling the efficiency of the or each said turbine to be maximised, while at the same time enabling electrical power generated by the or each said turbine to be transferred efficiently to a supply grid of fixed frequency.

The feedback means may be adapted to apply at least one said first control signal responsive to the frequency of at least one said third electrical signal.

The feedback means may be adapted to apply at least one said control signal, responsive to the velocity of said tidal water movement, to said control means.

This provides the advantage of enabling the efficiency of the or each said turbine to be controlled as the velocity of tidal water movement varies with time.

The apparatus may further comprise AC/DC converter means for receiving the or each said first electrical signal and outputting DC signals to said drive means in response thereto.

The apparatus may further comprise DC/AC converter means for receiving the or each said second electrical signal and outputting said third electrical signals in response thereto.

The drive means may be adapted to control the speed of rotation of at least one said turbine to limit the efficiency thereof.

This provides the advantage of protecting the apparatus from damage in the event of excessive energy output by one or more turbines.

The drive means may be adapted to cause rotation of at least one said turbine from standstill thereof.

This provides the advantage of assisting the turbine to overcome frictional forces during starting thereof.

According to another aspect of the present invention, there is provided a method of generating electrical power from tidal water movement, the method comprising:

causing at least one electrical turbine to be driven by tidal water movement to generate a respective first electrical signal;

controlling the speed of rotation of the or each said turbine by means of drive means located remotely from the or each said turbine to control the efficiency thereof; and outputting at least one second electrical signal from said drive means to supply electrical power generated by the or each said turbine.

The method may further comprise the step of controlling the speed of rotation of the or each said turbine in response to the frequency of at least one electrical signal output by said drive means.

The method may further comprise the step of controlling the speed of rotation of the or each said turbine in response to the velocity of said tidal water movement.

The method may further comprise the step of controlling the speed of rotation of at least one said turbine to limit the efficiency thereof.

The method may further comprise the step of using said drive means to cause rotation of at least one said turbine from standstill thereof.

A preferred embodiment of the invention will now be described, by way of example only and not in any limitative sense, with reference to the accompanying drawing in which:

FIG. 1 is a schematic view of a tidally operated electricity generator embodying the present invention.

Referring to FIG. 1, a tidally driven electricity generator 1 has a series of turbines 2, each of which is mounted under water in an offshore location, for example suspended from floating buoys or anchored by cables to the sea bed, using methods which will be familiar to persons skilled in the art. Each turbine 2 has blades 3 which are rotated by tidal flow of water, to power a respective generator 4, which outputs AC electrical power (a first electrical signal) via a respective transformer 5 to a cable 6 and appropriate switch gear 7.

The cable 6 is connected to a further transformer 8 located onshore, and the transformer 8 is connected to two AC inputs of a drive 9 containing an AC/DC converter, one input 10 of which is connected via a cable to a control feedback device 11. The control feedback device 11 may be a flow meter which determines the velocity of the tidal flow, or may contain look-up tables containing information relating to the velocity of tidal flow at any particular time.

The drive 9 outputs DC electrical signals (a second electrical signal) along cabling 13 to DC/AC converter 14, which outputs AC electrical power via transformer 15 to a fixed frequency local supply grid 16. The drive 9 also controls the speed of rotation of each turbine 2 by adjustment of the frequency of signals output to the turbines from the drive 9 via switchgear 7, in a manner which will be familiar to persons skilled in the art.

The operation of the apparatus shown in FIG. 1 will now be described.

The speed of tidal water flow through the individual turbines 2 does not vary significantly between individual turbines at a given time, although it will be appreciated by persons skilled in the art that this speed can vary significantly over time. The efficiency of operation of each turbine is controlled by controlling the speed of rotation of each turbine, which in turn controls the angle of incidence between fluid driving the turbine and the blades 3 of the turbine.

When the speed of rotation of each turbine 2 has been set, by means of a controller in the drive 9, to operate at a given efficiency, the frequency of electricity output by each generator 4 depends upon that speed of rotation, and will be generally the same for all for the turbines. The electrical output signals are then input to drive 9 and are output via DC/AC converter 14 and transformer 15 to the local grid 16. However, because of the frequency of the electrical signals output by the turbines 2 can be different from that of the grid 16, the controller in drive 19 can vary the frequency of electrical signals output by cabling 13. As a result, the frequency of AC electrical power supplied by transformer 15 to the local supply grid can be matched to that of the grid 16 for optimum power transfer. The drive 9 may be controlled by a feedback loop (a third electrical signal—not shown) matching the output frequency of DC/AC converter 14 to the grid 16.

In addition to controlling the speed of rotation of the turbines 2 during normal operation so that they operate at maximum efficiency, the drive 9 may also be used to drive the turbines 2 during start-up of the generator to assist in overcoming frictional forces. Furthermore, in order to prevent damage to the generator caused by excessive power output, the drive 9 may also adjust the speed of rotation of each turbine to limit the efficiency of operation of the turbines.

It will be appreciated by persons skilled in the art that the above embodiment has been described by way of example only, and not in any limitative sense, and that various alterations and modifications are possible without departure from the scope of the invention as defined by the appended claims. For example, it will be appreciated that the present invention can be used with turbines having blades of variable as well as fixed pitch.

The invention claimed is:

1. An apparatus for generating electrical power from tidal water movement, the apparatus comprising:
   at least one electrical turbine adapted to be driven by tidal water movement to generate a respective first electrical signal;
   at least one drive apparatus located remotely from the or each said turbine for receiving at least one said first electrical signal, controlling the speed of rotation of the or each said turbine to adjust the efficiency thereof, and outputting at least one second electrical signal to supply electrical power generated by the or each said turbine;
   at least one feedback apparatus for providing at least one first control signal for use in controlling the speed of rotation of the or each said turbine by at least one said drive apparatus to adjust the efficiency thereof; and
   at least one control apparatus for receiving at least one said second electrical signal and outputting at least one third electrical signal to supply electrical power generated by the or each said turbine, wherein at least one said control apparatus is adapted to control the frequency of at least one said third electrical signal, wherein at least one said feedback apparatus is adapted to apply at least one said first control signal responsive to the frequency of at least one said third electrical signal.

2. An apparatus according to claim 1, wherein at least one said feedback apparatus is adapted to apply at least one said control signal, responsive to the velocity of said tidal water movement, to at least one said control apparatus.

3. An apparatus according to claim 1, further comprising at least one AC/DC converter apparatus for receiving at least one said first electrical signal and outputting DC signals to at least one said drive apparatus in response thereto.

4. An apparatus according to claim 3, further comprising at least one DC/AC converter apparatus for receiving at least one said second electrical signal and outputting said third electrical signals in response thereto.

5. An apparatus according to claim 1, wherein at least one said drive apparatus is adapted to control the speed of rotation of at least one said turbine to limit the efficiency thereof.

6. An apparatus according to claim 1, wherein at least one said drive apparatus is adapted to cause rotation of at least one said turbine from standstill thereof.

7. A method of generating electrical power from tidal water movement, the method comprising:
 causing at least one electrical turbine to be driven by tidal water movement to generate a respective first electrical signal;
 controlling the speed of rotation of the or each said turbine by means of at least one drive apparatus located remotely from the or each said turbine to control the efficiency thereof;
 outputting at least one second electrical signal from at least one said drive apparatus;
 receiving the or each said electrical signal at a control apparatus and outputting at least one third electrical signal to supply electrical power generated by the or each said turbine, wherein said control apparatus is adapted to control the frequency of the or each said third electrical signal; and
 controlling the speed of rotation of the or each said turbine in response to the frequency of at least one said third electrical signal output by at least one said control apparatus.

8. A method according to claim 7, further comprising the step of controlling the speed of rotation of the or each said turbine in response to the velocity of said tidal water movement.

9. A method according to claim 7, further comprising the step of controlling the speed of rotation of at least one said turbine to limit the efficiency thereof.

10. A method according to claim 7, further comprising the step of using at least one said drive apparatus to cause rotation of at least one said turbine from standstill thereof.

* * * * *